(12) United States Patent
Kneib et al.

(10) Patent No.: US 12,284,052 B2
(45) Date of Patent: Apr. 22, 2025

(54) METHOD AND DEVICE FOR PROCESSING DATA ASSOCIATED WITH A SIGNAL

(71) Applicant: Robert Bosch GmbH, Stuttgart (DE)

(72) Inventors: Marcel Kneib, Ingelheim (DE); Oleg Schell, Krautheim (DE)

(73) Assignee: ROBERT BOSCH GMBH, Stuttgart (DE)

( * ) Notice: Subject to any disclaimer, the term of this patent is extended or adjusted under 35 U.S.C. 154(b) by 59 days.

(21) Appl. No.: 18/045,871

(22) Filed: Oct. 12, 2022

(65) Prior Publication Data

US 2023/0122260 A1 Apr. 20, 2023

(30) Foreign Application Priority Data

Oct. 14, 2021 (DE) ...................... 10 2021 211 641.8

(51) Int. Cl.
*H04L 12/40* (2006.01)
*G06N 3/047* (2023.01)

(52) U.S. Cl.
CPC ....... *H04L 12/40006* (2013.01); *G06N 3/047* (2023.01); *H04L 2012/40273* (2013.01)

(58) Field of Classification Search
CPC .................................................. G06F 12/0808
See application file for complete search history.

(56) References Cited

U.S. PATENT DOCUMENTS 9,679,029 B2 * 6/2017 Ayala ...................... G06F 16/25
2005/0131848 A1 * 6/2005 Chickering ............ G06N 20/00
706/12

* cited by examiner

*Primary Examiner* — Henry Tsai
*Assistant Examiner* — Juanito C Borromeo
(74) *Attorney, Agent, or Firm* — NORTON ROSE FULBRIGHT US LLP; Gerard A. Messina

(57) ABSTRACT

A computer-implemented method for processing data which are associated for example with a signal transmittable and/or transmitted via a bus system, for example of a vehicle, including: at least intermittent provision of reference data for a statistical model which characterizes at least one average of at least one characteristic of the signal on the basis of a first average determined, for example dynamically, over a predefinable unweighted first number of values for the characteristic, and at least intermittent modification of the reference data at least in part on the basis of a second average determined, for example dynamically, over a predefinable weighted second number of values for the characteristic.

11 Claims, 7 Drawing Sheets

METHOD AND DEVICE FOR PROCESSING DATA ASSOCIATED WITH A SIGNAL

CROSS REFERENCE

The present application claims the benefit under 35 U.S.C. § 119 of German Patent Application No. DE 10 2021 211 641.8 filed on Oct. 14, 2021, which is expressly incorporated herein by reference in its entirety.

BACKGROUND INFORMATION

The present invention relates to a method for processing data associated with a signal transmittable and/or transmitted for example via a bus system.

The present invention further relates to a device for processing data associated with a signal transmittable and/or transmitted for example via a bus system.

SUMMARY

Exemplary embodiments of the present invention relate to a method, for example a computer-implemented method, for processing data which are associated with a signal transmittable and/or transmitted, for example via a bus system, for example of a vehicle, including: at least intermittent provision of reference data for a statistical model which characterizes at least one average of at least one characteristic of the signal on the basis of a first average determined, for example dynamically, over a predefinable unweighted first number of values for the characteristic, and at least intermittent modification of the reference data at least in part on the basis of a second average determined, for example dynamically, over a predefinable weighted second number of values for the characteristic.

In further exemplary embodiments of the present invention, this enables, e.g., efficient formation of the reference data, e.g., online, thus dynamically, thus during operation, e.g., of the bus system which is usable for transmission of the signal, and/or efficient adaptation of the reference data, e.g., to changing environmental conditions or other variables (e.g., temperature, humidity, etc.) which may have an influence on the signal or the characteristic.

In further exemplary embodiments of the present invention, the signal may for example be characterized by a time profile of an electrical voltage and/or an electrical current, such as are transmittable, e.g., via a transmission medium of the bus system.

In further exemplary embodiments, the signal may also be transmittable or transmitted other than via the bus system stated by way of example, for example in general via a transmission medium which may for example be wired or wireless or may include combinations of wired and/or wireless transmission media.

In further exemplary embodiments, the bus system is of one of the following types: CAN, CAN FD, CAN XL, 10BASET1S, LIN, FlexRay, MOST, KNX, LSN, ARINC bus, MIL bus, among others.

In further exemplary embodiments of the present invention, the at least one characteristic of the signal may characterize for example a) a, for example temporal, fluctuation of the signal or of at least some components of the signal, for example a clock skew, and/or b) a difference in transition times which are observable for state changes of the signal, for example from a first signal level to a second signal level and vice versa, and/or c) a time difference between a first point in time and a second point in time, wherein, at the first point in time, a signal output by a transmitter for example on the transmission medium of the bus system reaches a first position with regard to the transmission medium, wherein, at the second point in time, the signal output by the transmitter for example on the transmission medium of the bus system reaches a second position with regard to the transmission medium, etc.

In further exemplary embodiments of the present invention, the at least one characteristic of the signal, e.g., characteristic of a transmitter or a source of the signal, for example, in the case of an optional bus system, a bus station, e.g., a control device of a vehicle. In further exemplary embodiments, the at least one characteristic or the model may accordingly be used to identify a transmitter or source.

Further exemplary embodiments of the present invention provide that the statistical model additionally characterizes (in addition to the average) a standard deviation of the at least one characteristic of the signal.

Further exemplary embodiments of the present invention provide that provision of the reference data includes: determination of the standard deviation of the at least one characteristic of the signal on the basis of the first average determined, for example dynamically, over the predefinable unweighted first number of values for the characteristic.

Further exemplary embodiments of the present invention provide that modification of the reference data includes: determination of the standard deviation of the at least one characteristic of the signal on the basis of the first average determined, for example dynamically, over the predefinable unweighted second number of values for the characteristic. In other words, some exemplary embodiments provide that the average for the reference data is formed differently (e.g., in unweighted manner) from the average for modifying the reference data (the latter being formed e.g. in weighted manner), whereas the standard deviation of the at least one characteristic is formed, e.g., independently of the reference (provision of the reference data or modification of (the already provided) reference data).

Further exemplary embodiments of the present invention provide that the method includes: predefinition of a weighting factor, for example for modifying the reference data. In further exemplary embodiments, the weighting factor may, e.g., also be varied dynamically, i.e. during modification of the reference data or the corresponding average, whereby modification of the average of the model may be controlled flexibly e.g. during use of the model.

Further exemplary embodiments of the present invention provide that the method includes: formation of the first average determined over the predefinable unweighted first number of values for the characteristic according to: $M_i^k = M_{i-1}^k + c_i^k - M_{i-1}^k/i$, wherein $c_i^k$ characterizes an $i^{th}$ value, for example measured value, of the characteristic for a $k^{th}$ source, for example a $k^{th}$ control device, wherein $M_i^k$ is the average for the $k^{th}$ source associated with the $i^{th}$ value $c_i^k$, wherein for example $1 < i \leq m$, wherein m characterizes a number of values for provision of the reference data.

Further exemplary embodiments of the present invention provide that the method includes: formation of the second average determined, for example dynamically, over a predefinable weighted second number of values for the characteristic according to: $M_j^k = \omega \cdot M_{j-1}^k + (1-\omega) \cdot c_j^k$, wherein $c_j^k$ characterizes a $j^{th}$ value, for example measured value, of the characteristic for a $k^{th}$ source, for example a $k^{th}$ control device, wherein $M_j^k$ is the average for the $k^{th}$ source associated with the $j^{th}$ value $c_j^k$, and wherein $\omega$ characterizes a or the weighting factor.

Further exemplary embodiments of the present invention provide that the standard deviation is formed according to the following equations:

$$V_i^k = V_{i-1}^k + (c_i^k - M_{i-1}^k) \times (c_i^k - M_i^k)$$

$$S_i^k = \sqrt{\frac{V_i^k}{i-1}},$$

wherein $V_i^k$ is an operand which is based on the first average $M_i^k$, for example formed according to equation $$M_i^k = M_{i-1}^k + \frac{c_i^k - M_{i-1}^k}{i},$$

and on the $i^{th}$ value $c_i^k$, for example measured value, of the characteristic for a $k^{th}$ source, wherein $S_i^k$ is the standard deviation.

In further exemplary embodiments of the present invention, e.g. $M_1^k = c_1^k$, and/or $V_1^k = 0$ and/or $S_1^k = 0$ and/or $M_{j-1}^k = M_m^k$ and/or $m < j$ apply.

Further exemplary embodiments of the present invention relate to a device for carrying out the method according to the embodiments.

Further exemplary embodiments of the present invention relate to a control device, for example for a vehicle, for example motor vehicle, including at least one device according to the embodiments.

Further exemplary embodiments of the present invention relate to a computer-readable storage medium comprising commands which, on execution by a computer, cause the latter to carry out the method according to the embodiments.

Further embodiments of the present invention relate to a computer program comprising commands which, on execution of the program by a computer, cause the latter to carry out the method according to the embodiments.

Further exemplary embodiments of the present invention relate to a data carrier signal which transmits and/or characterizes the computer program according to the embodiments.

Further exemplary embodiments of the present invention relate to a use of the method according to the embodiments and/or of the device according to the embodiments and/or of the control device according to the embodiments and/or of the computer-readable storage medium according to the embodiments and/or of the computer program according to the embodiments and/or of the data carrier signal according to the embodiments for at least one of the following elements: a) provision of reference data for a statistical model, b) modification, for example dynamic adaptation, of the reference data for the statistical model, c) provision of an intrusion detection system and/or intrusion detection and prevention system, d) authentication and/or identification of a transmitter.

Further features, possible applications and advantages of the present invention will be apparent from the following description of exemplary embodiments of the present invention which are depicted in the figures. All the features described or depicted, either individually or in any combination, constitute the subject-matter of the present invention, irrespective of how they are respectively worded or depicted in the description or figures.

DETAILED DESCRIPTION OF EXAMPLE EMBODIMENTS

Figure 1:
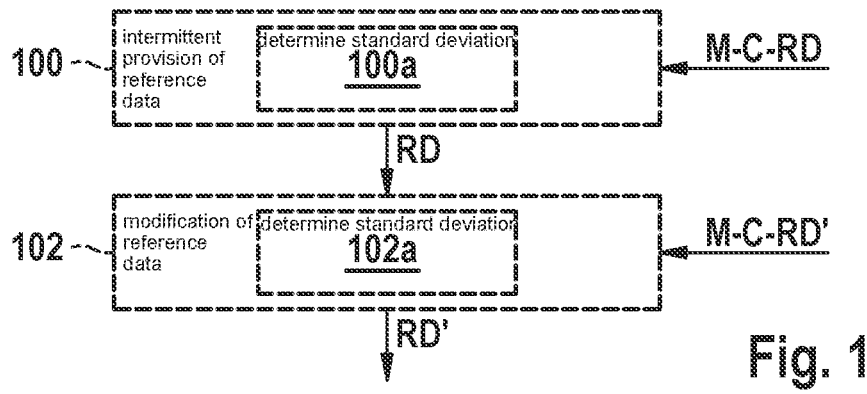
FIG. 1 schematically shows a simplified flow chart of a method according to exemplary embodiments of the present invention.
Figure 2:
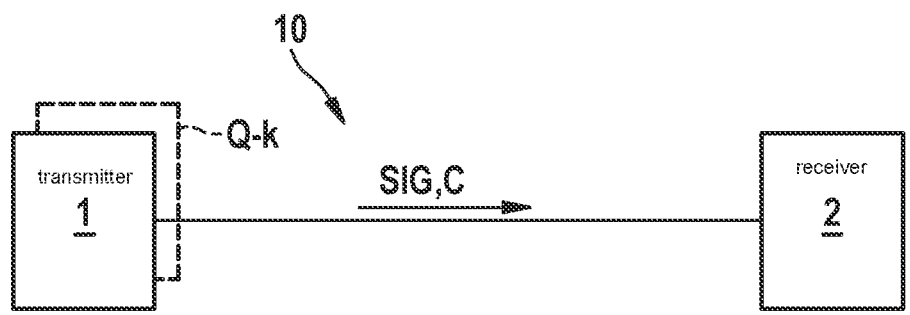
FIG. 2 schematically shows a simplified block diagram according to further exemplary embodiments of the present invention.
Figure 3:
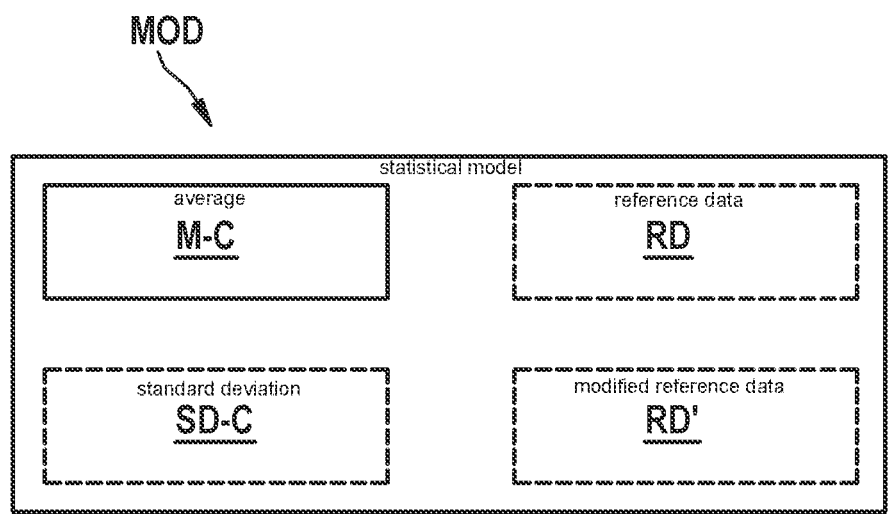
FIG. 3 schematically shows a simplified block diagram according to further exemplary embodiments of the present invention.

Exemplary embodiments, cf. FIGS. 1, 2, relate to a method, for example a computer-implemented method, for processing data which, for example, are associated with a signal SIG (FIG. 2) transmittable and/or transmitted, via a bus system 10, for example of a vehicle 20 (FIG. 11), including: at least intermittent provision 100 (FIG. 1) of reference data RD for a statistical model MOD, see FIG. 3, which characterizes at least one average M-C of at least one characteristic C of the signal SIG, on the basis of a first average M-C-RD (FIG. 1) determined, for example dynamically, over a predefinable unweighted first number of values for the characteristic C, and at least intermittent modification 102 of the reference data RD at least in part on the basis of a second average M-C-RD' determined, for example dynamically, over a predefinable weighted second number of values for the characteristic C.

In further exemplary embodiments, this enables e.g. efficient formation 100 of the reference data RD, e.g. online, thus dynamically, thus during operation e.g. of the bus system 10 which is usable for transmission of the signal SIG, thus for example when messages are sent via the bus system 10, and/or efficient adaptation of the reference data RD e.g. to changing environmental conditions or other variables (e.g. temperature, humidity, etc.) which may have an influence on the signal SIG or the characteristic C.

In further exemplary embodiments, the signal SIG may for example be characterized by a time profile of an electrical voltage and/or an electrical current, such as are transmittable e.g. via a transmission medium (e.g. including one or more bus lines, not shown) of the optional bus system 10.

In further exemplary embodiments, the signal SIG may also be transmittable or transmitted other than via the bus system 10 stated by way of example, for example in general via at least one transmission medium which may for example be wired or wireless or may include combinations of wired and/or wireless transmission media.

In further exemplary embodiments, the at least one characteristic C of the signal SIG may characterize for example a) a, for example temporal, fluctuation of the signal SIG or of at least some components (e.g. frequency components or time components) of the signal SIG, for example a clock skew, and/or b) a difference in transition times which are observable for state changes of the signal SIG, for example from a first signal state or level to a second signal state or level and vice versa, and/or c) a time difference between a first point in time and a second point in time, wherein, at the first point in time, a signal output by a transmitter 1 (FIG. 2) on the transmission medium of the bus system 10 reaches a first position with regard to the transmission medium, wherein, at the second point in time, the signal SIG output by the transmitter 1 on the transmission medium of the bus system 10 reaches a second position with regard to the transmission medium, etc. In further exemplary embodiments, other characteristics of the signal SIG may alternatively or additionally also be considered or e.g. a corresponding respective average characterized by the model MOD.

Figure 11:
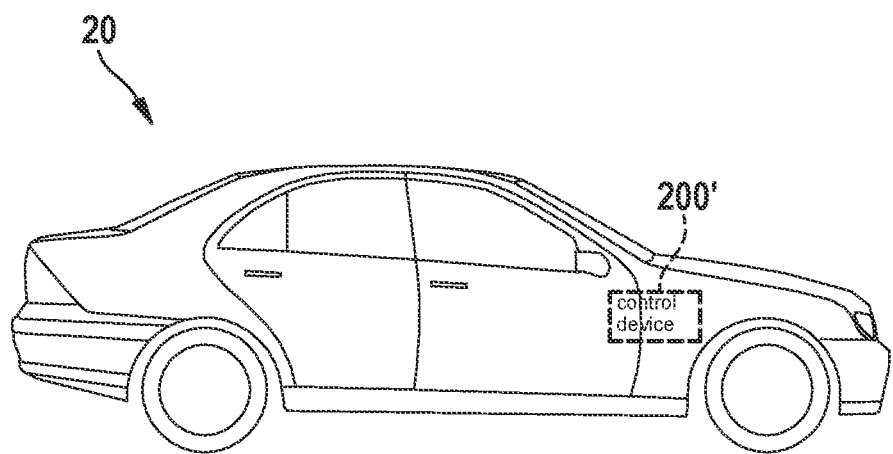
FIG. 11 schematically shows a simplified block diagram according to further exemplary embodiments of the present invention.

In further exemplary embodiments, the at least one characteristic C of the signal SIG e.g. characteristic of a transmitter 1 or a source Q-k of the signal SIG, for example a bus station, e.g. a control device of a vehicle 20 (FIG. 11). In further exemplary embodiments, the at least one characteristic C or the model MOD may accordingly be used e.g. to identify a transmitter 1 or a source Q-k, for example in a further control device or in general receiver 2 which can receive the signal SIG sent via the bus system 10.

Further exemplary embodiments provide that the statistical model MOD additionally (to the average M-C) characterizes a standard deviation SD-C (FIG. 3) of the at least one characteristic C (FIG. 2) of the signal SIG.

Further exemplary embodiments, FIG. 1, provide that provision 100 of the reference data RD includes: determination 100*a* of the standard deviation SD-C of the at least one characteristic C of the signal SIG on the basis of the first average M-C-RD determined, for example dynamically, over the predefinable unweighted first number of values for the characteristic C.

Further exemplary embodiments, FIG. 1, provide that modification of 102 the reference data RD includes: determination 102*a* of the standard deviation SD-C of the at least one characteristic C of the signal SIG on the basis of the first average M-C-RD determined, for example dynamically, over the predefinable unweighted second number of values for the characteristic. In other words, some exemplary embodiments provide that the average M-C-RD for the reference data RD is formed differently (e.g. in unweighted manner) from the average M-C-RD' for modifying 102 the reference data RD (the latter being formed e.g. in weighted manner), whereas the standard deviation SD-C of the at least one characteristic C is formed e.g. independently of the reference (provision 100 of the reference data RD or modification 102 of (the already provided) reference data RD).

Figure 4:
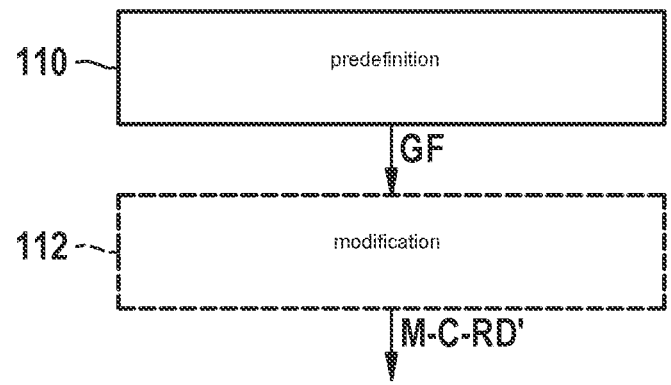
FIG. 4 schematically shows a simplified flow chart according to further exemplary embodiments of the present invention.

Further exemplary embodiments, FIG. 4, provide that the method includes: predefinition 110 of a weighting factor GF, for example for modifying 102 (FIG. 1) the reference data RD. In further exemplary embodiments, the weighting factor GF may e.g. also be varied dynamically, i.e. during modification 112 of the reference data RD or the corresponding average m-C-RD', whereby modification of the average of the model MOD may be controlled flexibly e.g. during use of the model MOD.

Figure 5:
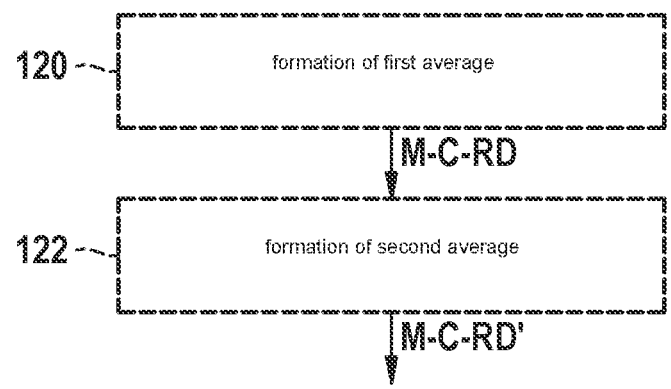
FIG. 5 schematically shows a simplified flow chart according to further exemplary embodiments of the present invention.

Further exemplary embodiments, FIG. 5, provide that the method includes: formation 120 of the first average M-C-RD determined over the predefinable unweighted first number of values for the characteristic C according to:

$$M_i^k = M_{i-1}^k + \frac{c_i^k - M_{i-1}^k}{i},$$

wherein $c_i^k$ characterizes an $i^{th}$ value, for example measured value (and/or value determined by calculation and/or formed in another manner), of the characteristic C for a $k^{th}$ source Q-k (FIG. 2), for example a $k^{th}$ control device, wherein $M_i^k$ is the average for the $k^{th}$ source associated with the $i^{th}$ value $c_i^k$, wherein for example $1 < i \leq m$, wherein m characterizes a number of values for provision of the reference data. For example, in this variant, the first average M-C-RD associated with the current, $i^{th}$ value of the characteristic C is therefore based on the average $M_{i-1}^k$ associated with the $(i-1)^{th}$ value of the characteristic, on the index variable i, and on the $i^{th}$ value $c_i^k$ of the characteristic C, such that comparatively little memory and comparatively few computing time resources are used for the determination. In particular, it is not necessary in exemplary embodiments to store numerous, e.g. all, preceding values $c_{i-1}^k, c_{i-2}^k, \ldots$ or $M_{i-2}^k$, $M_{i-3}^k, \ldots$ etc.

Further exemplary embodiments, FIG. 5, provide that the method includes: formation 122 of the second average M-C-RD' determined, for example dynamically, over a predefinable weighted second number of values for the characteristic C according to: $M_j^k = \omega \cdot M_{j-1}^k + (1-\omega) \cdot c_j^k$, wherein $c_j^k$ characterizes a $j^{th}$ value, for example measured value, of the characteristic C for a $k^{th}$ source, for example a $k^{th}$ control device, wherein $M_j^k$ is the average for the $k^{th}$ source associated with the $j^{th}$ value $c_j^k$, and wherein $\omega$ characterizes a or the weighting factor GF (FIG. 4) such that comparatively little memory and comparatively few computing time resources are used for the determination. In particular, it is not necessary in exemplary embodiments to store numerous, e.g. all, preceding values $c_{j-1}^k, c_{j-2}^k, \ldots$ or $M_{j-2}^k$, $M_{j-3}^k, \ldots$ etc.

Further exemplary embodiments provide that the standard deviation SD-C is formed according to the following equations:

$$V_i^k = V_{i-1}^k + (c_i^k - M_{i-1}^k) \times (c_i^k - M_i^k)$$

$$S_i^k = \sqrt{\frac{V_i^k}{i-1}},$$

wherein $V_i^k$ is an operand which is based on the first average $M_i^k$ or M-C-RD, for example formed according to equation $$M_i^k = M_{i-1}^k + \frac{c_i^k - M_{i-1}^k}{i},$$

and on the $i^{th}$ value $c_i^k$, for example measured value, of the characteristic C for a $k^{th}$ source Q-k (FIG. 2), wherein $S_i^k$ is the standard deviation.

In further exemplary embodiments, e.g. $M_1^k = c_1^k$, and/or $V_1^k = 0$ and/or $S_1^k = 0$ and/or $M_{j-1}^k = M_m^k$ and/or $m < j$ apply.

The principle according to the embodiments may advantageously be used to provide reference data RD for statistical models MOD which characterize for example at least one average of at least one characteristic C of the signal SIG. The principle according to the embodiments is also applicable to models MOD or to reference data RD for models MOD which characterize a plurality of characteristics C of one or more signals SIG, wherein characteristics C or the signals SIG characterize e.g. physical properties of at least one transmitter 1 or source Q-k.

For example, the principle according to the embodiments is applicable to such models which are usable for identifying and/or detecting, e.g. intrusions into the bus system 10, e.g. by tampering with an existing transmitter 1 or by inserting an unauthorized transmitter (not shown). For example in further exemplary embodiments, a provision phase may be provided in which the reference data RD for the model MOD are provided, for example by way of block 100 according to FIG. 1.

In further exemplary embodiments, the reference data RD may e.g. include an average for a characteristic C of the signal SIG or a standard deviation for the characteristic C of the signal SIG, as can be determined e.g. during regular operation of the bus system, e.g. in the provision phase. In further exemplary embodiments, these values can then be used as reference data RD e.g. for an operating phase following the provision phase. In order to adapt the reference data RD to any possibly present environmental influences (temperature, humidity, etc.) which may e.g. also have an influence on the signal SIG or its waveform, the modification 102 of the reference data RD obtained according to block 100 may be carried out in further exemplary embodiments.

For example, assuming use of the principle according to the embodiments in a motor vehicle 20 (FIG. 11), provision 100 (FIG. 1) of the reference data RD may for example proceed on starting the motor vehicle 20, in order for example to obtain reference data RD which are valid for the current operation and current operating conditions of the motor vehicle 20. Provision 100 may, for example, proceed on the basis of m many values of the characteristic C, wherein, after provision as reference data RD e.g. the average M-C-RD and, optionally the standard deviation SD-C (for example formable on the basis of the average M-C-RD) are available. In further exemplary embodiments, after the provision phase (directly thereafter or a predefinable time later or repeatedly, e.g. periodically), the currently available reference data RD may be adapted, for example by way of the modification 102 according to FIG. 1. This provides modified reference data RD' which are adapted to the further operation of the motor vehicle 20.

Figure 6:
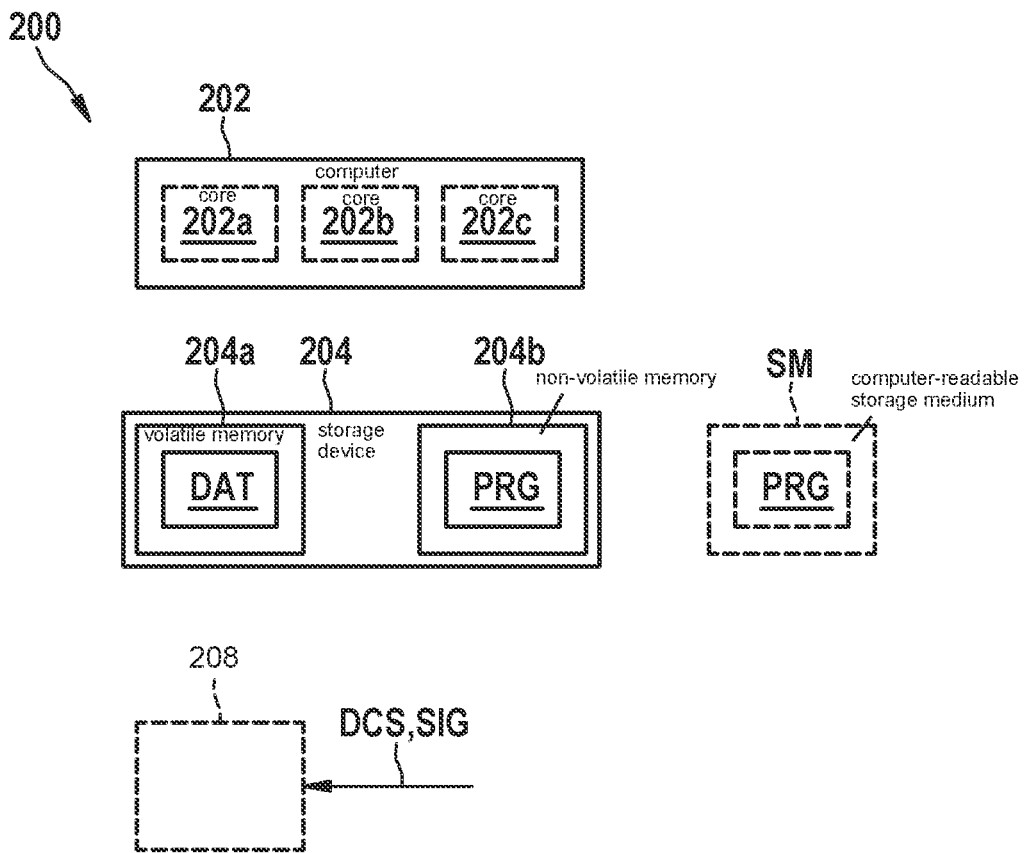
FIG. 6 schematically shows a simplified block diagram according to further exemplary embodiments of the present invention.

Further exemplary embodiments, FIG. 6, relate to a device 200 for carrying out the method according to the embodiments. For example, in further exemplary embodiments, the device 200 may take the form of a control device 200', e.g. for a motor vehicle 20 (FIG. 11), or be integrated into a control device 200', e.g. for a motor vehicle 20.

The device 200 includes a computing device ("computer") 202 having at least one computing core 202a, 202b, 202c and a storage device 204 associated with the computing device 202 for at least temporary storage at least one of the following elements: a) data DAT e.g. of the model MOD, e.g. the reference data RD or the modified reference data RD' or data characterizing the signal SIG, b) computer program PRG, in particular for carrying out a method according to the embodiments.

In further exemplary embodiments, the storage device 204 includes a volatile memory 204a (e.g. working memory (RAM)) and/or a nonvolatile memory 204b (e.g. flash EEPROM).

In further exemplary embodiments, the computing device 202 includes or takes the form of at least one of the following elements: microprocessor (µP), microcontroller (µC), application-specific integrated circuit (ASIC), system on chip (SoC), programmable logic chip (e.g. field programmable gate array (FPGA)), hardware circuit, or any desired combinations thereof.

Further exemplary embodiments relate to a computer-readable storage medium SM comprising commands PRG which, on execution by a computer 202, cause the latter to carry out the method according to the embodiments.

Further exemplary embodiments relate to a computer program PRG comprising commands which, on execution of the program by a computer 202, cause the latter to carry out the method according to the embodiments.

Further exemplary embodiments relate to a data carrier signal DCS which transmits and/or characterizes the computer program PRG according to the embodiments. The data carrier signal DCS is receivable, for example, via an optional data interface 208 of device 200 via which e.g. the signal SIG data is also receivable.

Further exemplary embodiments, FIG. 11, relate to a control device 200', for example for a vehicle, for example motor vehicle, 20 including at least one device 200 (FIG. 6) according to the embodiments.

Figure 7:
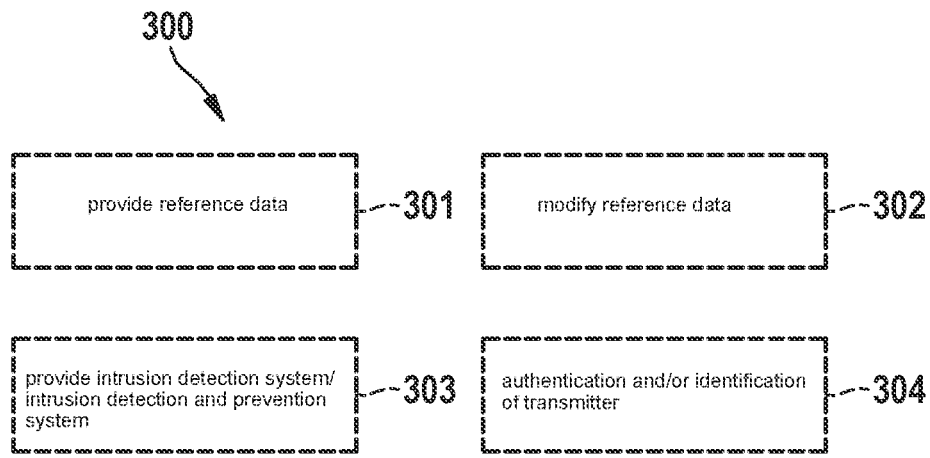
FIG. 7 schematically shows aspects of uses according to further exemplary embodiments of the present invention.

Further exemplary embodiments, FIG. 7, relate to a use 300 of the method according to the embodiments and/or of the device 200 according to the embodiments and/or of the control device 200' according to the embodiments and/or of the computer-readable storage medium SM according to the embodiments and/or of the computer program PRG according to the embodiments and/or of the data carrier signal DCS according to the embodiments for at least one of the following elements: a) provision 301 of reference data RD for a statistical model MOD, b) modification 302, for example dynamic adaptation, of the reference data RD for the statistical model MOD, c) provision 303 of an intrusion detection system and/or intrusion detection and prevention system, d) authentication 304 and/or identification of a transmitter 1, Q-k (FIG. 2).

Figure 8:
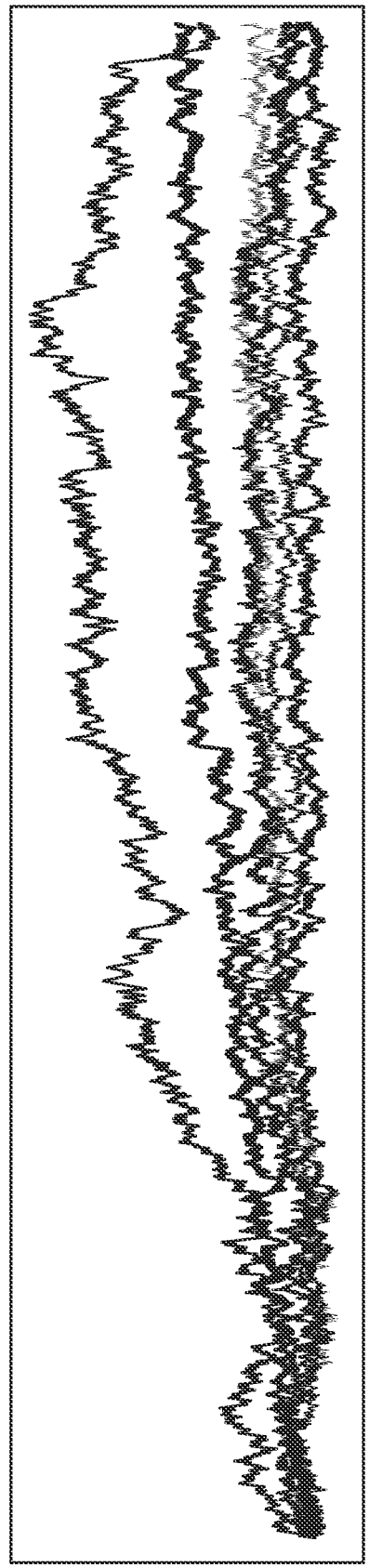
FIG. 8 schematically shows a diagram according to further exemplary embodiments of the present invention.

FIG. 8 is a schematic diagram of the effect of, for example external, influences such e.g. weather or temperature on signals from various transmitters. A total of five unlabeled curves are shown, for example in each case characterizing a characteristic of a respective signal SIG which is transmittable via the bus system 10 (FIG. 2), wherein the characteristic for example characterizes a time difference with regard to the signal SIG. The fluctuations of the vertically plotted time differences occurring along a horizontal axis, which characterizes e.g. a time profile or a number of received data frames with regard to the signal, are clearly apparent. This means e.g. that individual characteristics C which are characteristic of individual transmitters 1 may very well be subject to non-vanishing fluctuation which may impair precision in the case of evaluation on the basis of a statistical model MOD. These disadvantages can e.g. be at least temporarily mitigated in exemplary embodiments.

Figure 9:
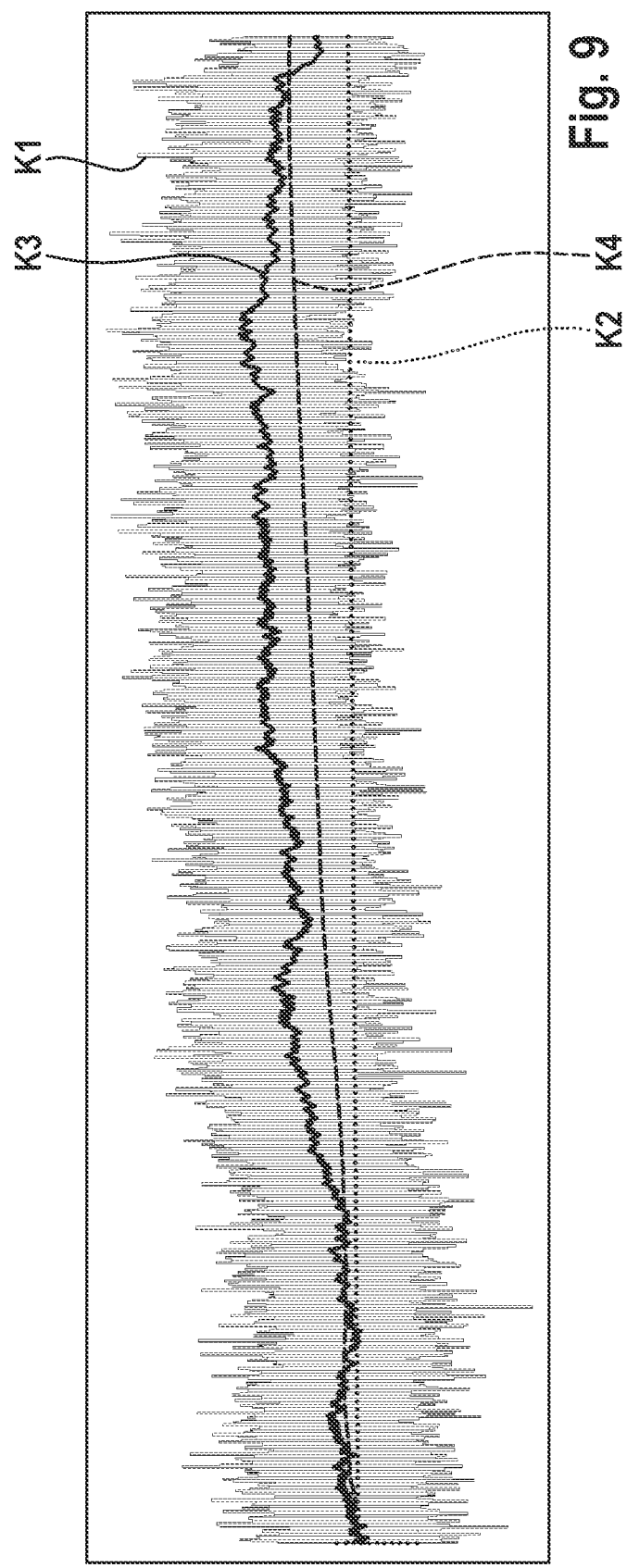
FIG. 9 schematically shows a diagram according to further exemplary embodiments of the present invention.

FIG. 9 shows an exemplary comparison of different approaches to adapting an average of a characteristic of a signal SIG. Curve K1 characterizes the signal SIG, curve K2 characterizes the, for example unweighted, first average M-C-RD, curve K3 characterizes the, for example weighted, second average M-C-RD', and curve K4 characterizes a constant plotted along a horizontal time axis. It is apparent that the weighted, second average M-C-RD' follows the signal curve K1 comparatively well, in particular more quickly than the unweighted average K2, so enabling efficient adaptation of the reference data RD or RD' e.g. to changed environmental conditions.

Figure 10:
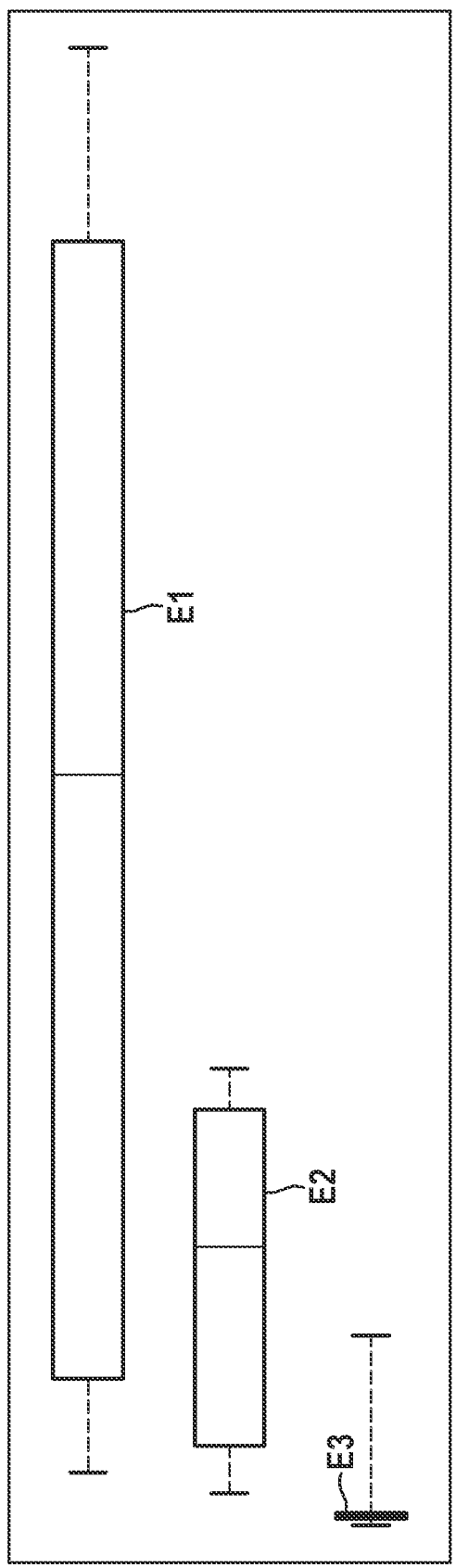
FIG. 10 schematically shows a diagram according to further exemplary embodiments of the present invention.

FIG. 10 shows examples of standard deviations according to various approaches. Element E1 characterizes the standard deviation of the signal SIG itself, cf. e.g. curve K1 according to FIG. 9. Element E2 characterizes the standard deviation determined on the basis of the first (unweighted) average M-C-RD, cf. e.g. curve K2 according to FIG. 9. Element E3 characterizes the standard deviation determined on the basis of the second (weighted) average M-C-RD', cf. e.g. curve K3 according to FIG. 9. It is apparent that the standard deviation E3 remains comparatively small and constant, which in further exemplary embodiments indicates good adaptability of the method or device 200 and thus enables e.g. reliable identification of a transmitter 1 or good intrusion detection, event in the event of changing external conditions such as for example temperature fluctuations.

What is claimed is:

1. A computer-implemented method for processing data which are associated with a signal transmittable and/or transmitted via a bus system, comprising the following steps:
   at least intermittently providing reference data for a statistical model which characterizes at least one average of at least one characteristic of the signal, based on a first average determined over a predefinable unweighted first number of values for the characteristic;
   at least intermittently modifying the reference data based at least in part on a second average determined over a predefinable weighted second number of values for the characteristic;
   forming the first average determined over the predefinable unweighted first number of values for the characteristic according to: $M_i^k = M_{i-1}^k + c_i^k - M_{i-1}^k/i$,
wherein $c_i^k$ characterizes an $i^{th}$ measured value of the characteristic for a $k^{th}$ source, wherein $M_i^k$ is an average for the $k^{th}$ source associated with the $i^{th}$ value $c_i^k$, for $1 < i \leq m$, wherein m characterizes a number of values for providing of the reference data.

2. The method as recited in claim 1, wherein the bus system is a bus system of a vehicle.

3. The method as recited in claim 1, wherein the statistical model additionally characterizes a standard deviation of the at least one characteristic of the signal.

4. The method as recited in claim 3, wherein the providing of the reference data includes: determining the standard deviation of the at least one characteristic of the signal based on the first average determined over the predefinable unweighted first number of values for the characteristic.

5. The method as recited in claim 3, wherein the modifying of the reference data includes: determining the standard deviation of the at least one characteristic of the signal based on the first average determined over the predefinable unweighted second number of values for the characteristic.

6. The method as recited in claim 1, further comprising: predefining a weighting factor for the modifying of the reference data.

7. A computer-implemented method for processing data which are associated with a signal transmittable and/or transmitted via a bus system, comprising the following steps:
   at least intermittently providing reference data for a statistical model which characterizes at least one average of at least one characteristic of the signal, based on a first average determined over a predefinable unweighted first number of values for the characteristic;
   at least intermittently modifying the reference data based at least in part on a second average determined over a predefinable weighted second number of values for the characteristic; and
   forming the second average determined over the predefinable weighted first number of values for the characteristic according to: $M_j^k = \omega \cdot M_{j-1}^k + (1-\omega) \cdot c_j^k$, wherein $c_j^k$ characterizes a $j^{th}$ measured value, of the characteristic for a $k^{th}$ source, wherein $M_j^k$ is an average for the $k^{th}$ source associated with the $j^{th}$ value $c_j^k$, and wherein w characterizes a weighting factor.

8. A device configured to process data which are associated with a signal transmittable and/or transmitted via a bus system, the device configured to:
   at least intermittently provide reference data for a statistical model which characterizes at least one average of at least one characteristic of the signal, based on a first average determined over a predefinable unweighted first number of values for the characteristic; and
   at least intermittently modify the reference data based at least in part on a second average determined over a predefinable weighted second number of values for the characteristic;
   form the first average determined over the predefinable unweighted first number of values for the characteristic according to: $M_i^k = M_{i-1}^k + c_i^k - M_{i-1}^k/i$,
wherein $c_i^k$ characterizes an $i^{th}$ measured value of the characteristic for a $k^{th}$ source, wherein $M_i^k$ is an average for the $k^{th}$ source associated with the $i^{th}$ value $c_i^k$, for $1 < i \leq m$, wherein m characterizes a number of values for providing of the reference data.

9. A control device a vehicle, comprising:
   at least one device configured to process data which are associated with a signal transmittable and/or transmitted via a bus system, the device configured to:
   at least intermittently provide reference data for a statistical model which characterizes at least one average of at least one characteristic of the signal, based on a first average determined over a predefinable unweighted first number of values for the characteristic; and
   at least intermittently modify the reference data based at least in part on a second average determined over a predefinable weighted second number of values for the characteristic;
   form the first average determined over the predefinable unweighted first number of values for the characteristic according to: $M_i^k = M_{i-1}^k + c_i^k - M_{i-1}^k/i$,
wherein $c_i^k$ characterizes an $i^{th}$ measured value of the characteristic for a $k^{th}$ source, wherein $M_i^k$ is an average for the $k^{th}$ source associated with the $i^{th}$ value $c_i^k$, for $1 < i \leq m$, wherein m characterizes a number of values for providing of the reference data.

10. A non-transitory computer-readable storage medium on which are stored commands for processing data which are associated with a signal transmittable and/or transmitted via a bus system, the commands, when executed by a computer, causing the computer to perform the following steps:

- at least intermittently providing reference data for a statistical model which characterizes at least one average of at least one characteristic of the signal, based on a first average determined over a predefinable unweighted first number of values for the characteristic; and
- at least intermittently modifying the reference data based at least in part on a second average determined over a predefinable weighted second number of values for the characteristic;
- forming the first average determined over the predefinable unweighted first number of values for the characteristic according to: $M_i^k = M_{i-1}^k + c_i^k - M_{i-1}^k/i$, wherein $c_i^k$ characterizes an $i^{th}$ measured value of the characteristic for a $k^{th}$ source, wherein $M_i^k$ is an average for the $k^{th}$ source associated with the $i^{th}$ value $c_i^k$, for $1 < i \leq m$, wherein m characterizes a number of values for providing of the reference data.

11. The method as recited in claim 1, wherein the method is used for:
   (i) providing an intrusion detection system and/or intrusion detection and prevention system, or
   (ii) authenticating and/or identification of a transmitter.

* * * * *